(12) United States Patent
Chen

(10) Patent No.: US 6,920,285 B1
(45) Date of Patent: Jul. 19, 2005

(54) FLASH DEVICE

(75) Inventor: Gyia-Yen Chen, Hsin-Chu Science-Based Industrial Park (TW)

(73) Assignee: Mustek Systems Inc. (TW)

( * ) Notice: Subject to any disclaimer, the term of this patent is extended or adjusted under 35 U.S.C. 154(b) by 0 days.

(21) Appl. No.: 10/751,459

(22) Filed: Jan. 6, 2004

(51) Int. Cl.⁷ .............................................. G03B 15/03
(52) U.S. Cl. .................................................. 396/177
(58) Field of Search ................................ 396/176–178

(56) References Cited

U.S. PATENT DOCUMENTS 5,565,941 A * 10/1996 Kaneko ..................... 396/177
6,351,609 B1 * 2/2002 Hosokawa et al. ......... 396/177

* cited by examiner

*Primary Examiner*—David M. Gray
(74) *Attorney, Agent, or Firm*—Lowe Hauptman & Berner, LLP

(57) ABSTRACT

The present invention relates to a built-in flash mechanism that will automatically pop up when the illumination is insufficient or it is manually switched on. This invention comprises a built-in flash, a one-way electromagnetic valve, a spring that will switch the flash on when there is no magnetic force from the electromagnetic valve, a shaft with two ends, where a first end is connected to the spring and react to the motion of the spring and a second end is a clip used to withhold the flash, a buckle clipped by the clip when the flash is shut, and a pusher used to push the shaft when the flash is being pressed into the close status.

6 Claims, 4 Drawing Sheets

FLASH DEVICE

BACKGROUND OF THE INVENTION

1. Field of the Invention

The present invention relates to a built-in flash mechanism that can be implemented in a digital camera, a conventional camera or other video devices. By the elasticity of the spring and the discharge of the electromagnetic valve, this invention can flick the flash up when the illumination is insufficient or it is manually switched on. With this method, a power-save, easy-to-use, and simple flash pop-up mechanism can be achieved.

2. Background Description

There are at least four types of flashlights utilized in cameras. They are hand-held, top-attachable, built-in and standalone flashlight devices. Among all types of flash units, built-in flashes are popular in both digital and conventional cameras. For built-in flashes, there are two types available: fixed and pop-up flashes. The present invention is a built-in pop-up flash, which will pop up manually, or pop-up when insufficient illumination is detected.

In addition, the existing built-in pop-up flash unit utilizes a two-way electromagnetic valve, which has drawbacks, such as complicated structure and large force needed to hold the flash inside the camera housing or to pop up the flash, requiring larger activation force. Besides, the current of the two-way electromagnetic valve is larger, thus consuming the precious battery power.

To surmount the drawbacks aforementioned, the present invention utilizes assembly of a one-way electromagnetic valve, auto illumination detection, and elasticity of the spring to constitute a small-force-needed, easy-to-use and simple structure.

SUMMARY OF THE INVENTION

It is therefore an object of the present invention to provide a small-force-needed, easy-to-use and simple structure flash device.

The present invention provides a built-in auto pop-up flash mechanism which comprises: a built-in flash; a one-way electromagnetic valve; a spring that will switch the flash on when there is no magnetic force from the electromagnetic valve; a shaft with two ends, where a first end is connected to the spring and react to the motion of the spring and a second end is a clip used to withhold the flash; a buckle clipped by the clip when the flash is shut; and a pusher used to push the shaft pivotally when the flash is being pressed to shut.

It is another aspect of the present invention to provide a built-in flash that can automatically pop-up when insufficient illumination is detected;

It is yet another aspect of the present invention to provide the built-in flash being able to pop up manually;

It is yet further aspect of the present invention that the electromagnetic valve is a one-way electromagnetic valve. And the force of the one-way electromagnetic valve is smaller than the force of a two-way electromagnetic valve, and the one-way electromagnetic valve is normal close by magnetic force. Moreover, an external force is needed to drive the iron core of the electromagnetic valve.

Furthermore, the elasticity of the spring is between the holding force and the release force of the electromagnetic valve. And the elasticity is the force that drives the iron core of the electromagnetic valve outwards.

Particularly, the gap between the shaft and the pusher is needed when the flash is shut.

BRIEF DESCRIPTION OF THE DRAWINGS

The foregoing and other objects, aspects and advantages will be better understood from the following detailed description of a preferred embodiment of the invention with reference to the drawings, in which.

Figure 1:
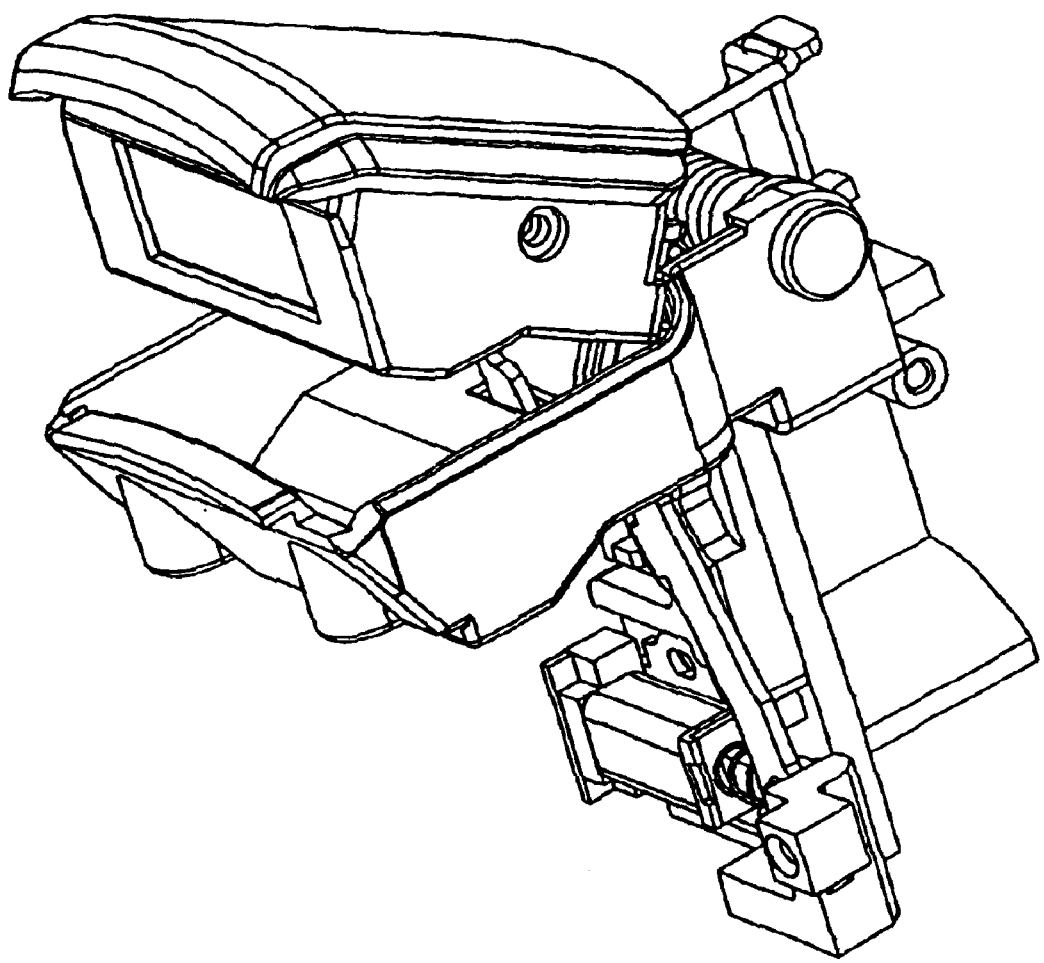
FIG. 1 shows the schematic appearance view of the built-in flash device in an open status.

The list of each elements and its numbering:
1: a flash
2: an electromagnetic valve
3: a spring
4: a shaft
5: a clip
6: a pusher
7: a buckle
8: a salient
9: a gap

DETAILED DESCRIPTION OF A PREFERRED EMBODIMENT OF THE INVENTION

The following is a description of the present invention. However, other than the detailed description, the present can also be widely implemented in other embodiment, and the scope of the present invention is not limited and is based on the future patent scope.

Figure 2:
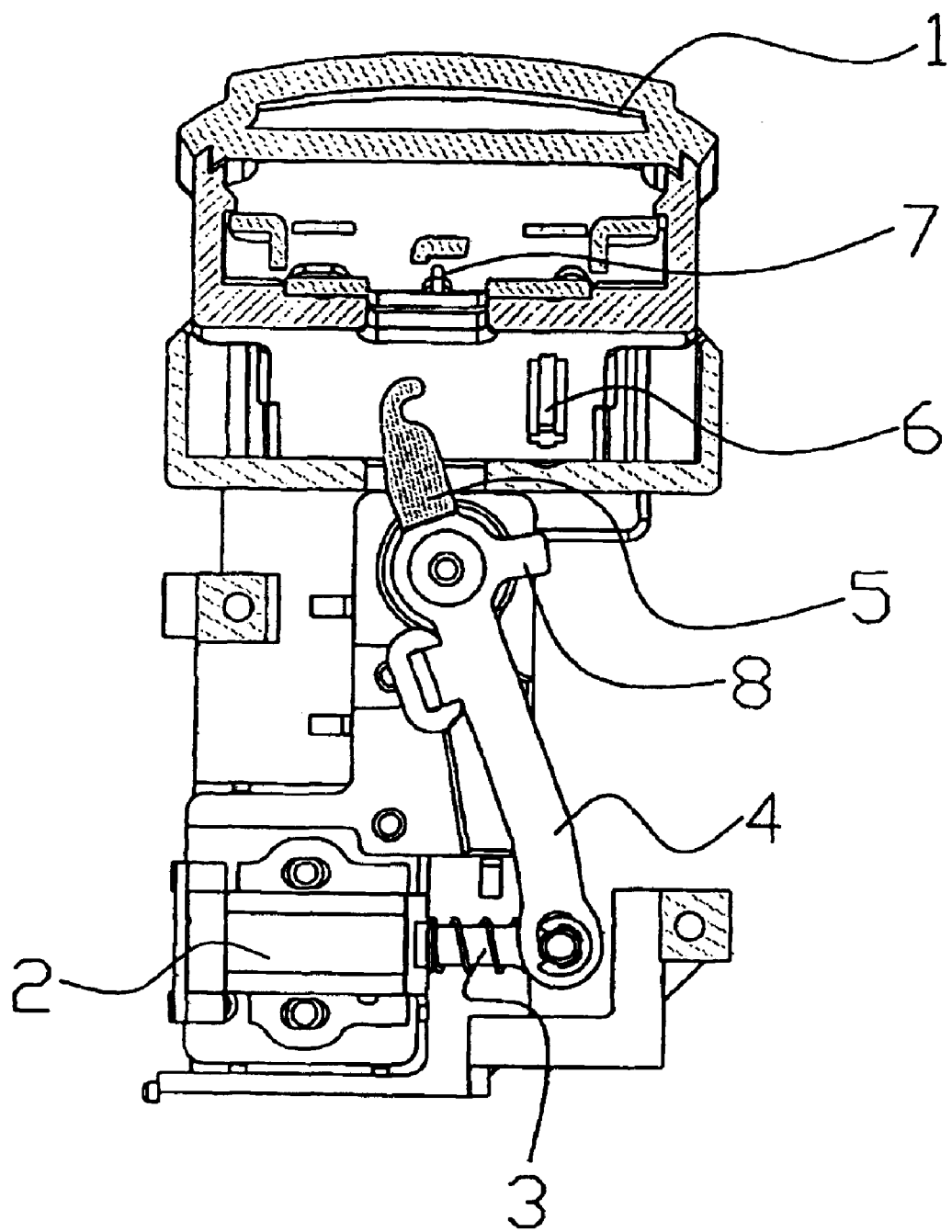
FIG. 2 shows the cross-sectional view of the flash device in an open status.
Figure 3:
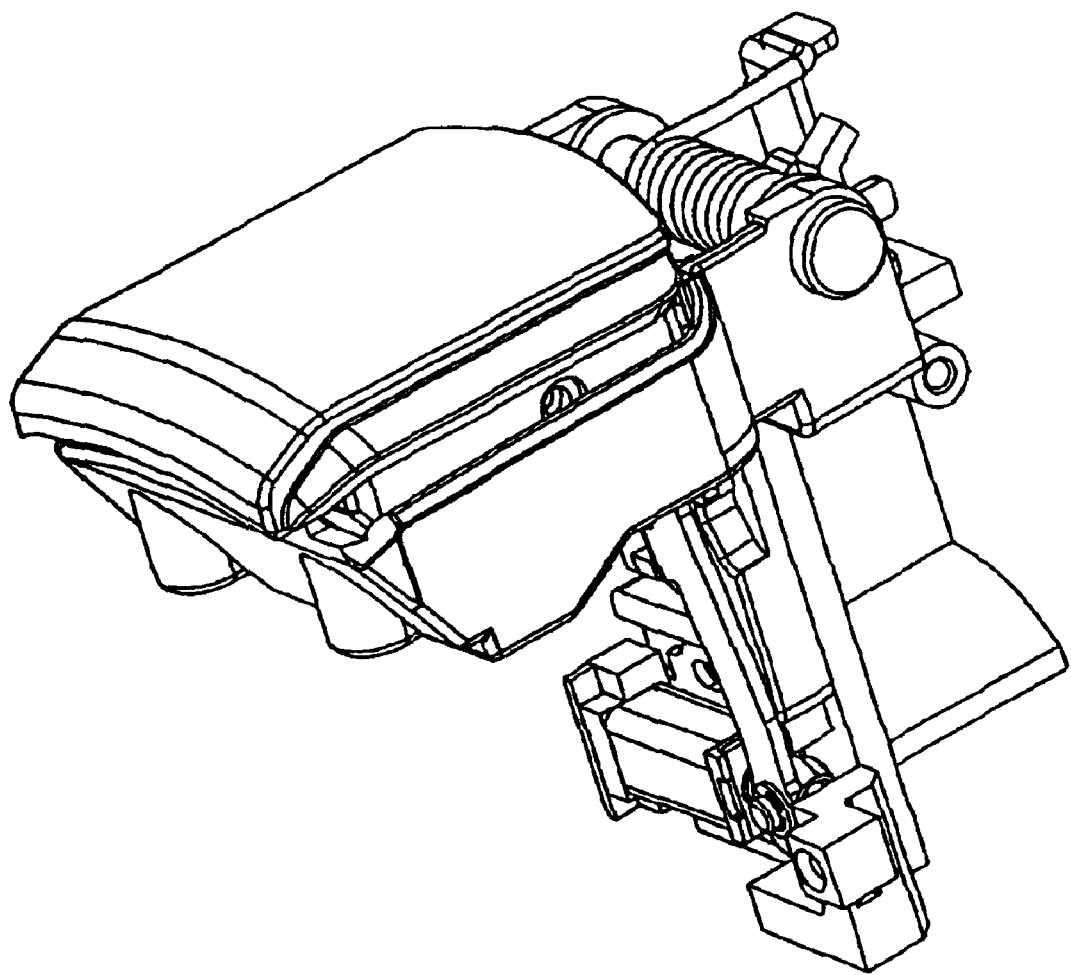
FIG. 3 shows the schematic appearance view of the flash device in a close status.

The present invention is illustrated in FIG. 2, which is the illustration of the embodiment when the flash is open. From this figure, the present invention includes a flash 1, an electromagnetic valve 2, a spring 3 which pops the flash 1 up when the electromagnetic valve 2 is discharged, a shaft 4 which is connected to the spring 3 and react to the motion of spring 3, a clip 5 which is connected to the shaft 4 and will release a buckle 7 of the flash 1 when the spring 3 drives the iron core of the electromagnetic valve outwards, and a pusher 6 which, at this stage, releases a salient 8 in shaft 4.

According to this, we can see that, when the electromagnetic valve 2 is discharged because there is either a manual instruction or insufficient illumination detected, the spring will push the iron core outwards, make the shaft 4 rotate and then the clip 5 will release buckle 7. At the same time, the pusher 6 will also release the salient 8 and the flash 1 will pop up and open.

Figure 4:
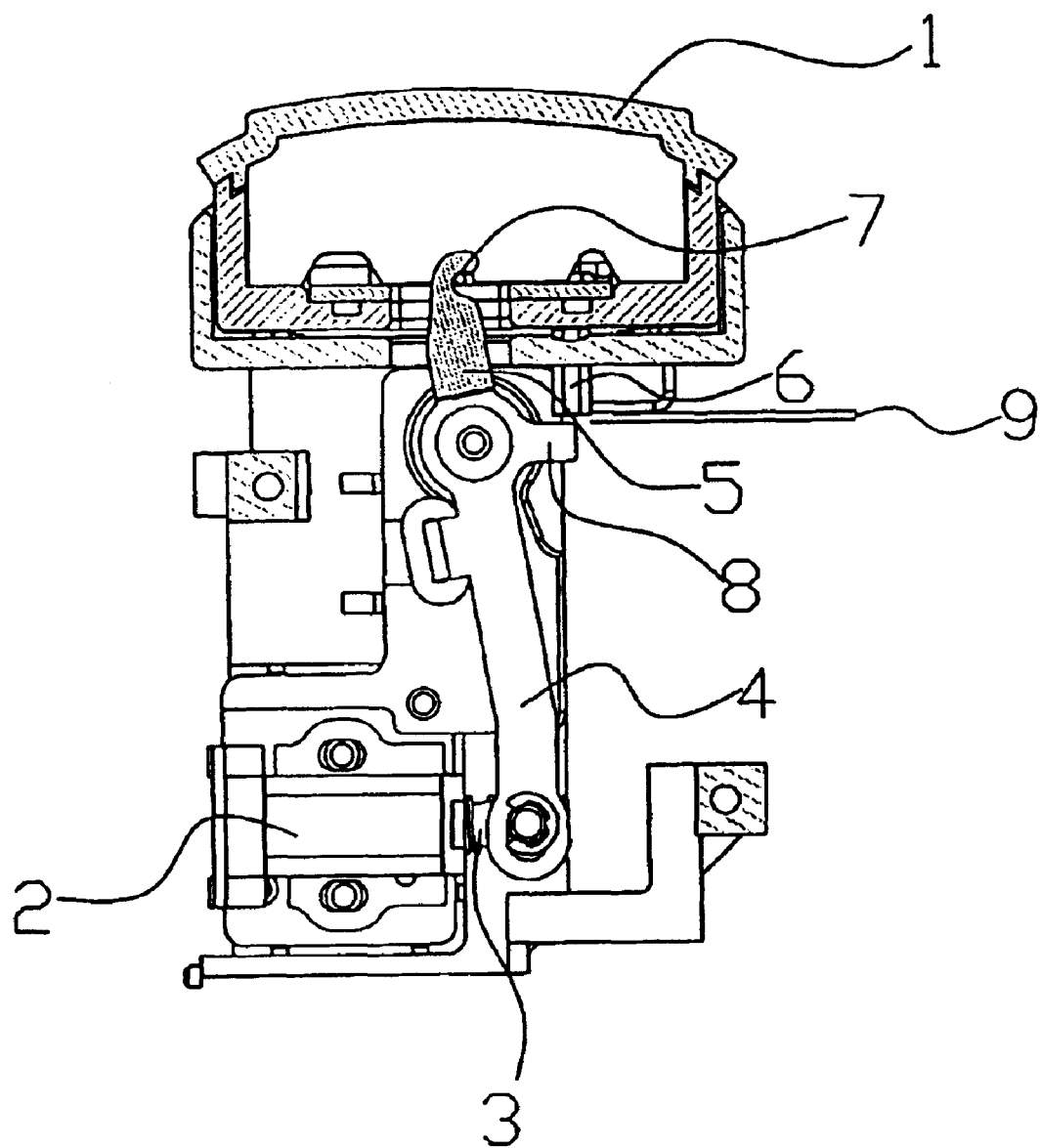
FIG. 4 shows the cross-sectional view of the embodiment of the flash device which is in a close status.

The present invention is also illustrated in FIG. 4 which is the illustration of the embodiment when the flash is close. When the flash 1 is manually pressed, the pusher 6 will push the salient 8 down, make the shaft 4 rotate and the clip 5 will clip buckle 7. At the same time, the iron core will be attracted by the charged electromagnetic valve 2. There is one thing that has to be noted; that is, when the flash 1 is close, there should be a gap between the pusher 6 and the salient 8, or the flash 1 will not be able to pop up again.

Particularly, the electromagnetic valve is a one-way electromagnetic valve. And the force of the one-way electromagnetic valve is smaller than the force of a two-way electromagnetic valve, and the one-way electromagnetic valve is normal close by magnetic force. Moreover, an external force is needed to drive the iron core of the electromagnetic valve. Furthermore, the elasticity of the spring is between the holding force and the release force of the electromagnetic valve. And the elasticity is the force that drives the iron core of the electromagnetic valve outwards. Moreover, the gap between the shaft and the pusher is needed when the flash is shut. The force of the one-way electromagnetic valve is smaller than force of a two-way electromagnetic valve, and the one-way electromagnetic valve is placed at a normal close position by magnetic force. An external force is needed to drive the iron core of the electromagnetic valve.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. A flash device comprising:

a flash unit;

an electromagnetic valve;

a spring for unfolding said flash unit out;

a single shaft with two ends, a first end connected to said spring and movable to the motion of said spring, and a second end as a clip used to withhold said flash unit;

a buckle clipped by said clip when said flash unit is shut; and a pusher used to push said shaft when said flash unit is being pressed to shut, wherein said shaft is pushed by said pusher back to a closed position along with said electromagnetic valve being charged to close said flash device.

2. The flash device of claim 1, wherein said flash unit is a built-in flash unit.

3. The flash device of claim 1, wherein said electromagnetic valve is a one-way electromagnetic valve.

4. The flash device of claim 1, wherein elasticity of said spring is between a holding force and a releasing force of said electromagnetic valve.

5. The flash device of claim 4, wherein said elasticity is the force that drives the iron core of said electromagnetic valve outwards and makes said flash unit open.

6. The flash device of claim 1, wherein an external force is needed to press said flash unit down to close said flash unit.

* * * * *